United States Patent
Park et al.

(10) Patent No.: US 8,487,513 B2
(45) Date of Patent: Jul. 16, 2013

(54) PIEZOELECTRIC ACTUATOR

(75) Inventors: Dong Sun Park, Seoul (KR); Jae Kyung Kim, Gyunggi-do (KR); Yeon Ho Son, Gyunggi-do (KR); Ki Suk Woo, Seoul (KR); Kum Kyung Lee, Gyunggi-do (KR); Ji Yeoun Jang, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 198 days.

(21) Appl. No.: 13/019,481

(22) Filed: Feb. 2, 2011

(65) Prior Publication Data

US 2012/0153775 A1    Jun. 21, 2012

(30) Foreign Application Priority Data

Dec. 17, 2010   (KR) .................. 10-2010-0130307

(51) Int. Cl.
*H01L 41/08* (2006.01)
(52) U.S. Cl.
USPC .......................................... 310/326; 310/324

(58) Field of Classification Search
USPC .......................................... 310/326, 327, 345
See application file for complete search history.

(56) References Cited

U.S. PATENT DOCUMENTS

| | | | | | |
|---|---|---|---|---|---|
| 3,731,124 | A | * | 5/1973 | Bryant | 310/326 |
| 3,786,202 | A | * | 1/1974 | Schafft | 310/324 |
| 4,054,808 | A | * | 10/1977 | Tanaka | 310/323.21 |
| 4,308,481 | A | * | 12/1981 | Nakamura et al. | 310/321 |
| 4,328,442 | A | * | 5/1982 | Tanaka et al. | 310/326 |
| 5,078,013 | A | * | 1/1992 | Kuramochi et al. | 73/620 |
| 7,304,413 | B2 | * | 12/2007 | Kasahara | 310/326 |

* cited by examiner

*Primary Examiner* — Mark Budd
(74) *Attorney, Agent, or Firm* — Ladas & Parry LLP

(57) ABSTRACT

Disclosed herein is a piezoelectric actuator. The piezoelectric actuator includes a piezoelectric element generating vibrations by repetitively expanding and restoring according to power applied from the outside to be linearly driven; a support member contacts the piezoelectric element in order to support the piezoelectric element; and vibration control members attached to one surface of and the support member and the piezoelectric element.

8 Claims, 3 Drawing Sheets

PIEZOELECTRIC ACTUATOR

CROSS REFERENCE TO RELATED APPLICATION

This application claims the benefit of Korean Patent Application No. 10-2010-0130307, filed on Dec. 17, 2010, entitled "Piezoelectric Actuator", which is hereby incorporated by reference in its entirety into this application.

BACKGROUND OF THE INVENTION

1. Technical Field

The present invention relates to a piezoelectric actuator.

2. Description of the Related Art

Various methods allowing a user to more easily and conveniently perform communication with a computer or programs have been used. A technology for applying one type of haptic interface, a haptic module has been used.

Haptic refers to "tactile sense", which is a concept that reflects the intuitive experience of the user to an interface other than an input technology, such as a touch, and allows more diverse feedback. The reason why a UI is spotlighted is that hardware contention has reached a saturation state in an electronic device market.

Therefore, the haptic module can be considered to be a solution satisfying consumer demand.

Generally, the haptic module uses a piezoelectric actuator using a piezoelectric effect in order to generate vibrations.

The piezoelectric actuator transfers vibrations to the user through the feedback. According to the prior art, in order to transfer the vibrations to the user, a starting time when the piezoelectric actuator generates vibrations are approximately 9 ms and after transferring the feedback, a falling time when the vibrations are reduced is approximately 13.4 ms.

As described above, the piezoelectric actuator according to the prior art has a problem in transferring an immediate response to the user.

In addition, the user feels a weak vibration during the response starting time or the falling time of the piezoelectric actuator, such that he/she cannot experience a pleasant interface environment.

SUMMARY OF THE INVENTION

The present invention has been made in an effort to provide a piezoelectric actuator with improved immediate response characteristics in order for a user to feel that vibrations according to an operation of an electronic device are directly fedback by directly providing vibrations to a touch screen of a mobile communication terminal or a portable terminal, rather than using a manner of vibrating the whole mobile communication terminal or portable terminal using a vibration motor.

According to a preferred embodiment of the present invention, there is provided a piezoelectric actuator, including: a piezoelectric element generating vibrations by repetitively expanding and restoring according to power applied from the outside to be linearly driven; a support member contacting the piezoelectric element in order to support the piezoelectric element; and vibration control members attached to one surface of the support member and the piezoelectric element.

The piezoelectric actuator may further include a case receiving the piezoelectric element, the support member, and the vibration control members.

The vibration control members may be attached to the top portion of the piezoelectric element and the bottom portion of the support member to contact the top portion and the bottom portion in the case by the driving according to the expansion and restoration of the piezoelectric element.

The vibration control members may be attached to the top portion and the bottom portion in the case to contact the top portion of the piezoelectric element and the bottom portion of the support member by the driving according to the expansion and restoration of the piezoelectric element.

The vibration control members may be attached to the top portion in the case and the bottom portion of the support member to contact the top portion of the piezoelectric element and the bottom portion in the case by the driving according to the expansion and restoration of the piezoelectric element.

The vibration control members may be attached to the top portion of the piezoelectric element and the bottom portion in the case to contact the top portion in the case and the bottom portion of the support member by the driving according to the expansion and restoration of the piezoelectric element.

The support member may be made of an elastic material to be changed together with the piezoelectric element according to the repetitive expansion and restoration of the piezoelectric element to be linearly driven.

The support member may be made of a material of Sus or Invar.

The case may further include a coupling protrusion formed on the bottom portion in the case and coupling the support member with the case to transfer the vibrations of the piezoelectric element to the outside.

The vibration control member may be made of a Poron material in order to reduce vibrations and noise.

DESCRIPTION OF THE PREFERRED EMBODIMENTS

Figure 1:
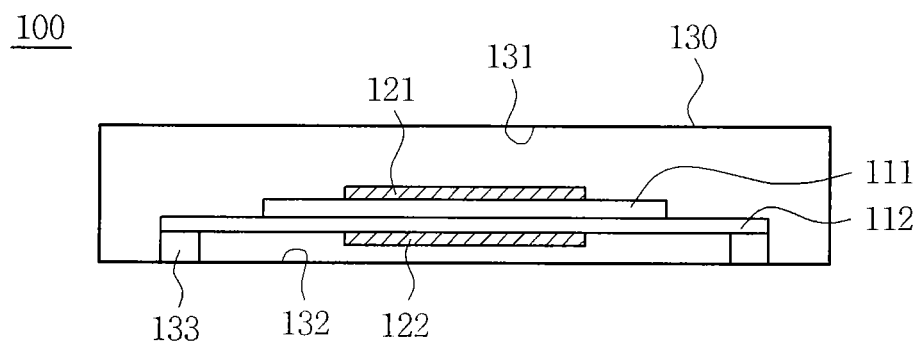
FIG. 1 is a cross-sectional view of a piezoelectric actuator according to a first preferred embodiment of the present invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. Terms used in the specification, 'first', 'second', etc. can be used to describe various components, but the components are not to be construed as being limited to the terms. The terms are only used to differentiate one component from other components. Further, in describing the present invention, a detailed description of related known functions or configurations will be omitted so as not to obscure the subject of the present invention. Further, when it is determined that the detailed description of the known art related to the present invention may obscure the gist of the present invention, the detailed description will be omitted.

Hereinafter, the preferred embodiments of the present invention will be described in detail with reference to the accompanying drawings.

FIG. 1 is a cross-sectional view of a piezoelectric actuator 100 according to a first preferred embodiment of the present invention. As shown in FIG. 1, the piezoelectric actuator 100 is configured to include a piezoelectric element 111, a support member 112, vibration control members 121 and 122, and a case 130.

In more detail, the piezoelectric actuator 100 is configured to include the piezoelectric element 111 generating vibrations by being repetitively expanded and restored according to power applied from the outside to be linearly driven and a support member 112 contacting the piezoelectric element 111 in order to support the piezoelectric elements 111.

In addition, the support member 112 is linearly driven by repetitively expanding and restoring the piezoelectric element 111, such that it is made of an elastic material in order to be changed together with the piezoelectric element 111.

Therefore, the support member 112 may be made of various materials, but the present invention may be made of Sus or Invar.

As shown in FIG. 1, the case 130 has a space formed therein in order to include the piezoelectric actuator 100.

In addition, a bottom portion 132 in the case 130 is provided with a coupling protrusion 133 capable of coupling the support member 112 with the case 130 and transferring the vibrations of the piezoelectric element 111 to peripheral components contacting the piezoelectric actuator 100.

As shown in FIG. 1, the vibration control members 121 and 122 is attached to the top portion of the piezoelectric element 111 and the bottom portion of the support member 112 in order to limit the driving displacement of the piezoelectric element 111.

In more detail, the vibration control member 121 according to the first preferred embodiment of the present invention is attached to the top portion of the piezoelectric element 111 and the vibration control member 122 is attached to the bottom portion of the support member 112.

Therefore, the piezoelectric element 111 repetitively expanding and restoring according to the power applied from the outside contacts the top portion 131 and the bottom portion 132 in the case 130, such that the driving displacement of the piezoelectric element 111 is limited.

Figure 5:
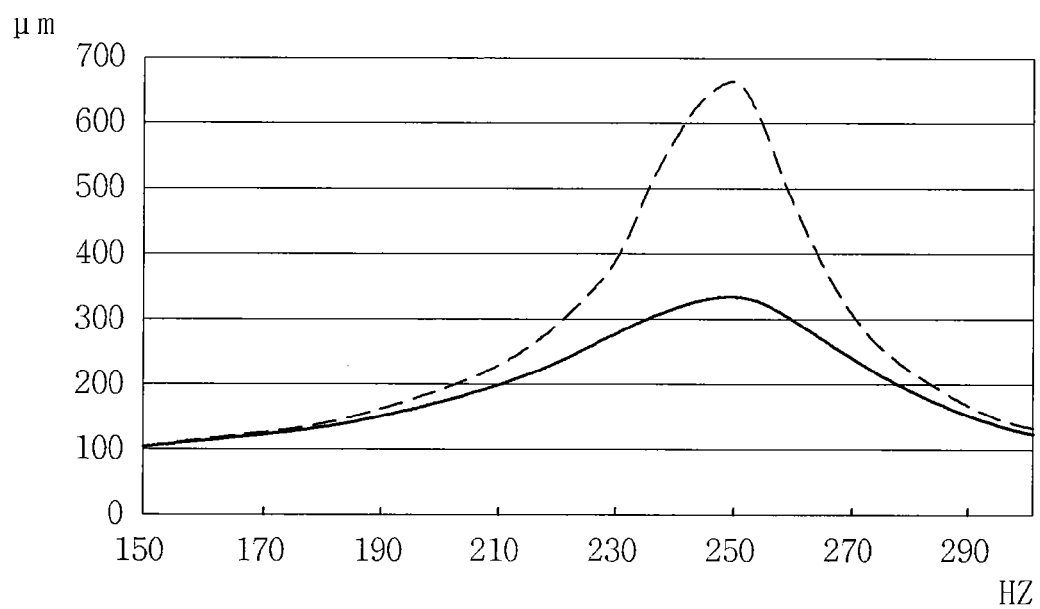
FIG. 5 is a graph showing a frequency of the piezoelectric actuator according to the first preferred embodiment of the present invention.

FIG. 5 is a graph showing a frequency of the piezoelectric actuator according to the first preferred embodiment of the present invention, wherein a dotted line shows the frequency of the piezoelectric actuator according to the prior art and a solid line shows the frequency of the piezoelectric actuator according to the present invention.

As shown in FIG. 5, the piezoelectric actuator according to the prior art has a displacement between 600 μm and 650 μm in the resonance band of 250 Hz.

On the other hand, the piezoelectric actuator 100 including the vibration control members 121 and 122 has a displacement between about 300 μm and 350 μm in the resonance band of 250 Hz.

Further, FIG. 5 shows that the displacement of the piezoelectric actuator 100 according to the present invention is lower than that of the piezoelectric actuator according to the prior art even in a ±50 Hz band.

Therefore, the displacement of the piezoelectric actuator 100 according to the present invention is small to rapidly generate vibrations, such that it can rapidly transfer the feedback to the user.

Since the vibrations are also rapidly reduced, weak vibrations are not transferred to the user.

The following Table 1 shows data obtained by repetitively experimenting the starting time (ms, millisecond) when the vibrations are generated in the piezoelectric actuator 100 and the falling time (ms) when the vibrations are reduced, in the case where the support member 112 of the piezoelectric actuator 100 according to the first preferred embodiment of the present invention is made of Sus.

TABLE 1

| Frequency | 1 | 2 | 3 | 4 | 5 | 6 | 7 | 8 | 9 | 10 |
|---|---|---|---|---|---|---|---|---|---|---|
| Starting time—millisecond | 4.0 | 4.0 | 4.0 | 4.0 | 3.8 | 4.0 | 4.0 | 4.0 | 4.0 | 4.0 |
| Falling time—millisecond | 7.0 | 7.0 | 6.8 | 7.2 | 6.8 | 7.0 | 6.8 | 6.8 | 6.8 | 6.8 |

As described in the above Table 1, the starting time when the vibrations are generated in the piezoelectric actuator 100 according to the present invention consumes a maximum of 4 ms and a minimum of 3.8 ms and consumes an average of 3.98 ms.

Therefore, when comparing with the starting time, 9 ms when the vibrations are generated in the piezoelectric actuator according to the prior art, the piezoelectric actuator 100 according to the present invention rapidly generates the vibrations as quickly as about 5 ms.

Therefore, the piezoelectric actuator 100 according to the present invention rapidly transfers the vibrations to the user, such that the user can immediately feel the feedback.

As described in the above Table 1, in the piezoelectric actuator 100 according to the present invention, the falling time when the vibrations are reduced consumes a maximum of 7.2 ms and a minimum of 6.8 ms and consumes an average of 6.9 ms after the vibrations are transferred to the user.

Therefore, when comparing with the falling time, 13.4 ms when the vibrations are generated in the piezoelectric actuator according to the prior art, the piezoelectric actuator 100 according to the present invention reduces the vibrations rapidly as quickly as about 6.5 ms.

Therefore, the piezoelectric actuator 100 according to the present invention does not feel the weak vibrations by the user, thereby making it possible to provide the pleasant and immediate feedback.

The following Table 2 shows data obtained by repetitively experimenting the starting time (ms) when the vibrations are generated in the piezoelectric actuator 100 and the falling time (ms) when the vibrations are reduced, in the case where the support member 112 of the piezoelectric actuator 100 according to the first preferred embodiment of the present invention is made of Invar.

TABLE 2

| Frequency | 1 | 2 | 3 | 4 | 5 | 6 | 7 | 8 | 9 | 10 |
|---|---|---|---|---|---|---|---|---|---|---|
| Starting time—millisecond | 4.0 | 4.0 | 4.0 | 4.0 | 4.0 | 4.0 | 4.0 | 3.8 | 3.8 | 4.0 |

TABLE 2-continued

| Frequency | 1 | 2 | 3 | 4 | 5 | 6 | 7 | 8 | 9 | 10 |
|---|---|---|---|---|---|---|---|---|---|---|
| Falling time—millisecond | 7.0 | 7.0 | 7.0 | 7.0 | 7.2 | 7.2 | 6.8 | 6.8 | 6.8 | 7.2 |

As described in the above Table 2, the starting time when the vibrations are generated in the piezoelectric actuator 100 according to the present invention consumes a maximum of 4 ms and a minimum of 3.8 ms and consumes an average of 3.96 ms.

Therefore, when comparing with the starting time, 9 ms when the vibrations are generated in the piezoelectric actuator according to the prior art, the piezoelectric actuator 100 according to the present invention rapidly generates the vibrations as quickly as about 5 ms.

Therefore, the piezoelectric actuator 100 according to the present invention rapidly transfers the vibrations to the user, such that the user can immediately feel the feedback.

As described in the above Table 2, in the piezoelectric actuator 100 according to the present invention, the falling time when the vibrations are reduced consumes a maximum of 7.2 ms and a minimum of 6.8 ms and consumes an average of 7 ms after the vibrations are transferred to the user.

Therefore, when comparing with the falling time, 13.4 ms of the piezoelectric actuator according to the prior art, the piezoelectric actuator 100 according to the present invention rapidly reduces the vibrations as quickly as about 6.4 ms.

Therefore, the piezoelectric actuator 100 according to the present invention does not allow the user to feel the weak vibrations, thereby making it possible to transfer a pleasant and immediate feedback.

In addition, the material of the support member 112 according to the first preferred embodiment of the present invention is not limited to Sus or Invar. Therefore, any material supporting the piezoelectric element 111 and including an elastic force capable of being changed together with the piezoelectric element 111 by repetitively expanding and restoring the piezoelectric element 111 to be linearly driven may be used.

Figure 6:
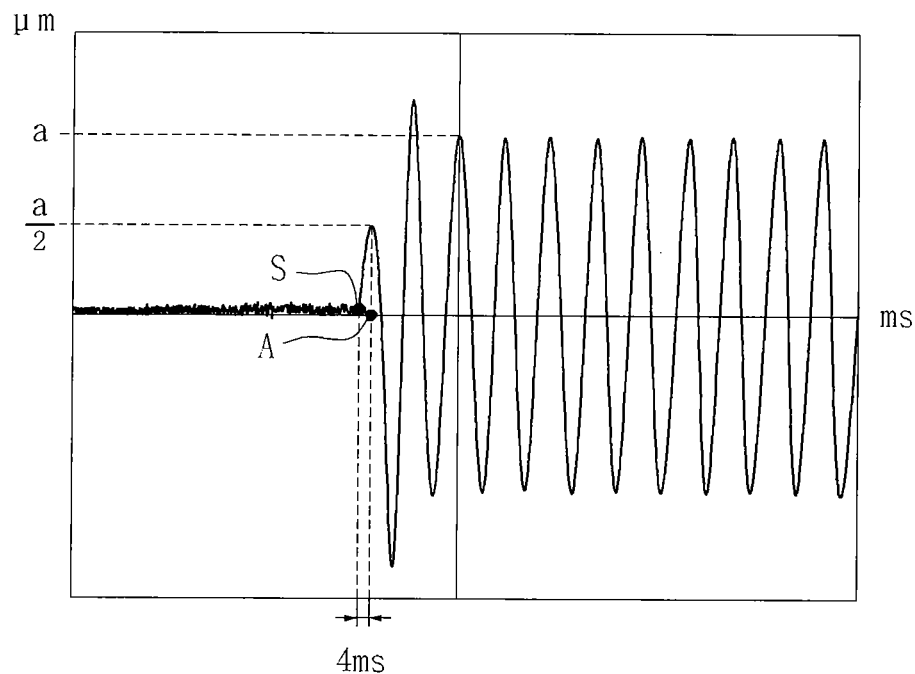
FIG. 6 is a graph showing a starting time when vibrations are generated by the reaction of the piezoelectric actuator according to the first preferred embodiment.

FIG. 6 is a graph showing a starting time when vibrations are generated by the reaction of the piezoelectric actuator according to the first preferred embodiment.

In more detail, FIG. 6 is a graph showing the time from a start point S where the piezoelectric element 111 reacts to the time A forming 50% (a/2) of a complete waveform a by power applied from the outside. As shown in FIG. 6, the piezoelectric actuator 100 according to the preferred embodiment of the present invention consumes approximately 4 ms until the waveform a/2 forming 50% of the complete waveform a is formed in order to transfer the vibrations to the user.

Therefore, the user can immediately feel the feedback by rapidly transfer the vibrations to the user.

Figure 7:
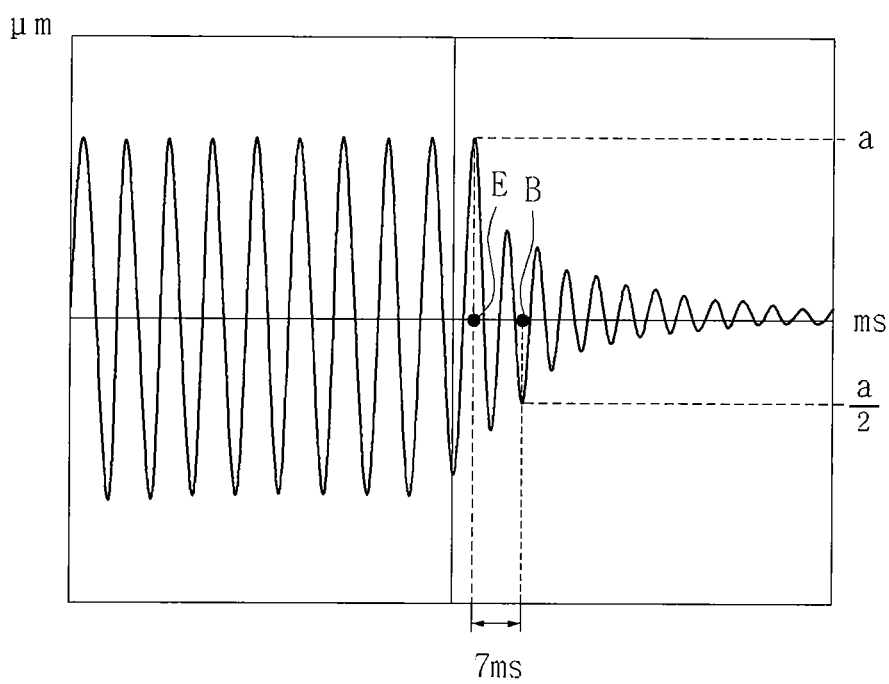
FIG. 7 is a graph showing a falling time when vibrations are reduced by the reaction of the piezoelectric actuator according to the first preferred embodiment.

FIG. 7 is a graph showing a falling time when vibrations are reduced by the reaction of the piezoelectric actuator according to the first exemplary embodiment.

In more detail, FIG. 7 is a graph showing the time from an end point E where the complete waveform a ends to the time B when the complete waveform is reduced to 50% a/2 by stopping the reaction of the piezoelectric element 111 due to the interruption of power applied from the outside.

As shown in FIG. 7, the piezoelectric actuator 100 according to the preferred embodiment of the present invention consumes approximately 7 ms until the waveform a/2 where 50% of the complete waveform a is reduced is formed after the vibrations is transferred to the user.

Therefore, the user does not feel the weak vibrations by rapidly reducing the vibrations, thereby making it possible to provide the pleasant and rapid feedback.

Figure 2:
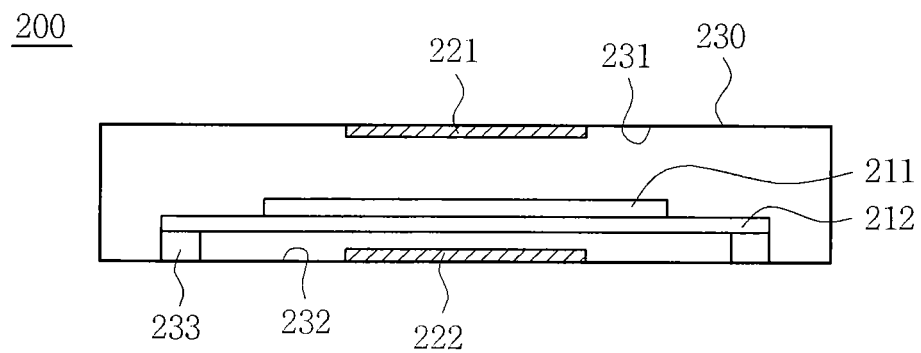
FIG. 2 is a cross-sectional view of a piezoelectric actuator according to a second preferred embodiment of the present invention.

FIG. 2 is a cross-sectional view of a piezoelectric actuator 200 according to a second exemplary embodiment of the present invention. As shown in FIG. 2, the piezoelectric actuator 200 is configured to include a piezoelectric element 211, a support member 212, vibration control members 221 and 222, and a case 230.

The configuration of the piezoelectric actuator 200 is the same as the first exemplary embodiment of the present invention and therefore, the technical features thereof will be omitted.

As shown in FIG. 2, the vibration control members 221 and 222 are attached to the inside of the piezoelectric actuator 200 in order to limit the driving displacement of the piezoelectric element 211.

In more detail, the vibration control member 221 according to the second exemplary embodiment of the present invention is attached to the top portion 231 in the case 230 and the vibration control member 222 is attached to the bottom portion 232 in the case 230.

Therefore, the piezoelectric element 211 repetitively expanding and restoring according to the power applied from the outside contacts the vibration control member 221 attached to the top portion 231 thereof.

In addition, the support member 212 contacts the vibration control member 222 attached to the bottom portion 232 thereof, thereby limiting the driving displacement of the piezoelectric element 211.

Figure 3:
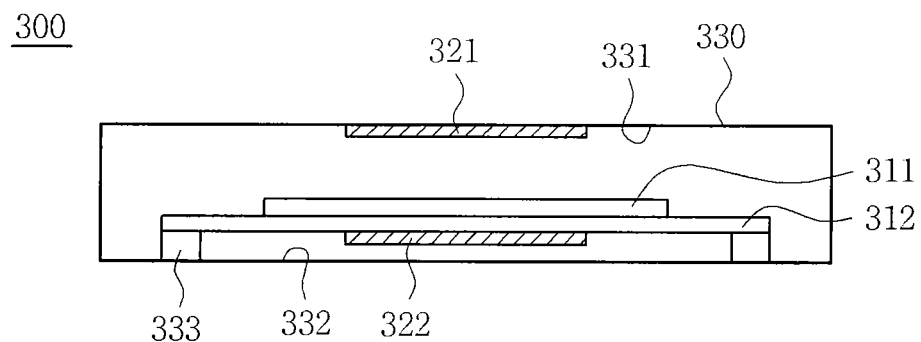
FIG. 3 is a cross-sectional view of a piezoelectric actuator according to a third preferred embodiment of the present invention.

FIG. 3 is a cross-sectional view of a piezoelectric actuator 300 according to a third exemplary embodiment of the present invention. As shown in FIG. 3, the piezoelectric actuator 300 is configured to include a piezoelectric element 311, a support member 312, vibration control members 321 and 322, and a case 330.

The configuration of the piezoelectric actuator 300 is the same as the first exemplary embodiment of the present invention and therefore, the technical features thereof will be omitted.

As shown in FIG. 3, the vibration control members 321 and 322 are attached to the inside of the piezoelectric actuator 300 in order to limit the driving displacement of the piezoelectric element 311.

In more detail, the vibration control member 321 according to the third exemplary embodiment of the present invention is attached to the top portion 331 in the case 330 and the vibration control member 322 is attached to the bottom portion in the support member 312.

Therefore, the piezoelectric element 311 repetitively expanding and restoring according to the power applied from the outside contacts the vibration control member 321 attached to the top portion 331 thereof.

In addition, the vibration control member 322 attached to the bottom portion of the support member 312 contacts the bottom portion 332 in the case 330, thereby limiting the driving displacement of the piezoelectric element 311.

Figure 4:
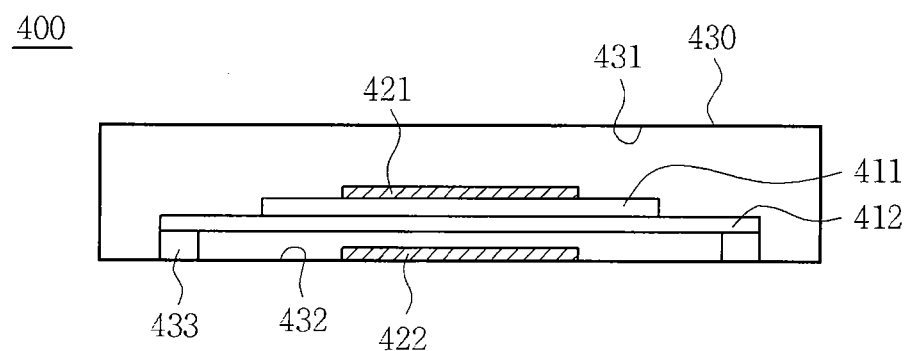
FIG. 4 is a cross-sectional view of a piezoelectric actuator according to a fourth preferred embodiment of the present invention.

FIG. 4 is a cross-sectional view of a piezoelectric actuator 400 according to a fourth exemplary embodiment of the present invention. As shown in FIG. 4, the piezoelectric actuator 400 is configured to include a piezoelectric element 411, a support member 412, vibration control device 421 and 422, and a case 430.

The configuration of the piezoelectric actuator 400 is the same as the first exemplary embodiment of the present invention and therefore, the technical features thereof will be omitted.

As shown in FIG. 4, the vibration control members 421 and 422 are attached to the inside of the piezoelectric actuator 400 in order to limit the driving displacement of the piezoelectric element 411.

In more detail, the vibration control member 421 according to the fourth exemplary embodiment of the present invention is attached to the top portion of the piezoelectric element 411 and the vibration control member 422 is attached to the bottom portion 432 in the case 430.

Therefore, the vibration control member 421 attached to the piezoelectric element 411 repetitively expanding and restoring according to the power applied from the outside contacts the top portion 431 in the case 430.

In addition, the support member 412 contacts the bottom portion 432 in the case 430, thereby limiting the driving displacement of the piezoelectric element 411.

As set forth above, the preferred embodiments of the present invention can provide the piezoelectric actuator having a vibration control member limiting a movement displacement of a piezoelectric element included therein and rapidly transfer the vibrations to the user, such that the user can feel the immediate feedback.

Further, the piezoelectric actuator according to the preferred embodiment of the present invention can provide a pleasant and immediate feedback so that the user does not feel the weak vibrations when the vibration is reduced.

Although the embodiments of the present invention has been disclosed for illustrative purposes, it will be appreciated that the piezoelectric actuator according to the invention is not limited thereby, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. A piezoelectric actuator, comprising:
   a piezoelectric element generating vibrations by repetitively expanding and restoring according to power applied from the outside to be linearly driven;
   a support member contacting the piezoelectric element in order to support the piezoelectric element;
   vibration control members attached to one surface of the support member and the piezoelectric element; and
   a case receiving the piezoelectric element, the support member, and the vibration control members,
   wherein the case further includes a coupling protrusion formed on the bottom portion in the case to couple the support member to the case to transfer the vibrations of the piezoelectric element to the outside.

2. The piezoelectric actuator as set forth in claim 1, wherein the vibration control members are attached to the top portion of the piezoelectric element and the bottom portion of the support member to contact the top portion and the bottom portion in the case by an elastic vibration of the piezoelectric element.

3. The piezoelectric actuator as set forth in claim 1, wherein the vibration control members are attached to the top portion and the bottom portion in the case to contact the top portion of the piezoelectric element and the bottom portion of the support member by an elastic vibration of the piezoelectric element.

4. The piezoelectric actuator as set forth in claim 1, wherein the vibration control members are attached to the top portion in the case and the bottom portion of the support member to contact the top portion of the piezoelectric element and the bottom portion in the case by an elastic vibration of the piezoelectric element.

5. The piezoelectric actuator as set forth in claim 1, wherein the vibration control members are attached to the top portion of the piezoelectric element and the bottom portion in the case to contact the top portion in the case and the bottom portion of the support member by an elastic vibration of the piezoelectric element.

6. The piezoelectric actuator as set forth in claim 1, wherein the support member is made of an elastic material to be elastically vibrated together with the piezoelectric element according to repetitively expand and restore the piezoelectric element to be linearly driven.

7. The piezoelectric actuator as set forth in claim 6, wherein the support member is made of a material of Sus or Invar.

8. The piezoelectric actuator as set forth in claim 1, wherein the vibration control member is made of a Poron material in order to reduce vibrations and noise.

* * * * *